(12) United States Patent
Williams et al.

(10) Patent No.: US 11,481,795 B2
(45) Date of Patent: Oct. 25, 2022

(54) SYSTEMS AND METHODS FOR PROVIDING LOCATION AWARE SERVICES

(71) Applicant: Verint Americas Inc., Alpharetta, GA (US)

(72) Inventors: Jamie Richard Williams, Fleet (GB); Robert Barnes, Watford (GB); Marc Calahan, Milton, GA (US)

(73) Assignee: Verint Americas Inc., Alpharetta, GA (US)

( * ) Notice: Subject to any disclaimer, the term of this patent is extended or adjusted under 35 U.S.C. 154(b) by 0 days.

(21) Appl. No.: 16/905,103

(22) Filed: Jun. 18, 2020

(65) Prior Publication Data
US 2020/0402092 A1 Dec. 24, 2020

Related U.S. Application Data (60) Provisional application No. 62/863,567, filed on Jun. 19, 2019.

(51) Int. Cl.
| | |
|---|---|
| *G06Q 30/02* | (2012.01) |
| *H04W 4/029* | (2018.01) |
| *G06N 20/00* | (2019.01) |
| *G06Q 10/06* | (2012.01) |

(52) U.S. Cl.
CPC ........ *G06Q 30/0224* (2013.01); *G06N 20/00* (2019.01); *G06Q 10/063116* (2013.01); *G06Q 30/0261* (2013.01); *H04W 4/029* (2018.02)

(58) Field of Classification Search
CPC ....... G06Q 10/063116; G06Q 30/0261; G06Q 30/0224; G06N 20/00; H04W 4/029
See application file for complete search history.

(56) References Cited

U.S. PATENT DOCUMENTS

| | | | |
|---|---|---|---|
| 9,875,481 B2 * | 1/2018 | Pradhan | G06Q 10/063118 |
| 10,237,256 B1 * | 3/2019 | Pena | H04L 63/0853 |
| 10,360,593 B2 * | 7/2019 | Hunter | H04H 20/61 |

(Continued)

OTHER PUBLICATIONS

Striker, IEEE 2008.*
(Continued)

*Primary Examiner* — Michael I Ezewoko
(74) *Attorney, Agent, or Firm* — Meunier Carlin & Curfman LLC (57) ABSTRACT

A system is provided that uses location aware technologies in a variety of environments including retail environments and workplace environments. Location aware technologies associated with computing devices such as mobile phones are used to track users as they move within an environment. With respect to retail environments, a loyalty application may be installed in the phone of a customer that can provide the location of the customer to the retail environment. When it is determined that the customer is near the retail environment, a user profile associated with the customer can be used to select offers or promotions that can be displayed to the customer by the loyalty application to encourage the customer to enter the retail environment. When it is determined that the customer is inside the retail environment, the location of the customer can be used to determine where to dispatch an employee to interact with the customer.

12 Claims, 6 Drawing Sheets

(56) References Cited

U.S. PATENT DOCUMENTS

| | | | | |
|---|---|---|---|---|
| 2015/0235161 A1* | 8/2015 | Azar | ............... | G06Q 30/0261 |
| | | | | 705/7.15 |
| 2015/0356569 A1* | 12/2015 | O'Malley | ............ | G07F 17/16 |
| | | | | 705/304 |
| 2016/0171577 A1* | 6/2016 | Robinson, Jr. | ........ | H04W 4/33 |
| | | | | 705/7.13 |
| 2019/0164098 A1* | 5/2019 | Setchell | ............ | G06Q 30/0238 |
| 2020/0005356 A1* | 1/2020 | Greenberger | ...... | G06Q 30/0623 |

OTHER PUBLICATIONS

Subrahmanya, IEEE 2010.*
Striker: employing RFID sensors in meeting customized retail shopping customer needs.*
International Search Report and Written Opinion, dated Aug. 12, 2020, received in connection with International Patent Application No. PCT/US2020/038341.

* cited by examiner

SYSTEMS AND METHODS FOR PROVIDING LOCATION AWARE SERVICES

CROSS-REFERENCE TO RELATED APPLICATIONS

This application claims the benefit of priority to U.S. Provisional Patent Application No. 62/863,567 filed on Jun. 19, 2019, entitled "SYSTEMS AND METHODS FOR PROVIDING LOCATION AWARE SERVICES," the contents of which are hereby incorporated by reference in its entirety.

BACKGROUND

Location aware services and technologies use the geographical location or area of a portable electronic device or wireless communication device, such as a smartphone, to provide the portable electronic device or wireless communication device data relevant to, or based on, the geographical location or area. However, uses of such services and technologies are currently limited.

SUMMARY

An embodiment that is described herein provides location aware technologies for use in a variety of environments including retail environments and office environments. Location aware technologies associated with computing devices such as mobile phones are used to track users as they move within an environment. With respect to retail environments, a loyalty application may be installed in the phone of a customer that can provide the location of the customer relative to the retail environment. When it is determined that the customer is near the retail environment, a user profile associated with the customer can be used to select offers or promotions that can be displayed to the customer by the loyalty application to encourage the customer to enter the retail environment. When it is determined that the customer is inside the retail environment, the location of the customer can be used to determine where to dispatch an employee to interact with the customer. The user profile can be further used to select the employee that is dispatched, to determine if the customer is waiting to pick up any items, or to determine items that may be recommended to the customer. In addition, the user profile can be used to determine whether to prioritize the customer over other customers in the retail environment.

With respect to office or work environments, a work application may be installed in the phone or device associated with each employee. The locations of the employees at various times may be tracked and logged. The tracked locations and times can be used for a variety of purposes such as time tracking, schedule compliance, and to determine if one or more workers should be added or removed from the work environment. The tracked locations and times can be correlated with known tasks locations to determine average completion times for a variety of tasks for each employee. The average completion times can be used to determine which employees may need additional training for a particular task. In addition, the location information can be used to provide additional security such as by comparing current employee locations with locations associated with computer accesses or logins.

In one embodiment, a system for providing location aware services is provided. The system includes one or more processors and a memory communicably coupled to the one or more processors. The memory stores a user-identification module and a user-experience module. The user-identification module may include instructions that when executed by the one or more processors cause the one or more processors to: receive information from a computing device associated with a user; based in part on the received information, retrieve a profile associated with the user; and based in part of the received information, determine a location of the user. The user-experience module includes instructions that when executed by the one or more processors cause the one or more processors to: retrieve a user-interest model; based in part on the user-interest model and the profile, determine one or more products or services for the user; provide information regarding the determined one or more products or services to a representative; and dispatch the representative to the determined location of the user.

Embodiments may include some or all of the following features. The location may be a location within a retail establishment, and the determined location of the user may be a location near or within the retail establishment. The user profile may include one or more of a transaction history, complaint history, or request history of the user with respect to the retail establishment. The user-interest model may be generated using one or more machine learning or artificial intelligence-based techniques. The user-experience module may further include instructions that when executed by the one or more processors cause the one or more processors to: based in part on the user-interest model and the profile, determine one or more offers for the user; and push the one or more offers to the computing device associated with the user. The user-experience module may further include instructions that when executed by the one or more processors cause the one or more processors to: based on the profile, determine one or more items waiting for the user; and dispatch the representative with the determined one or more items to the determined location of the user. The user-experience module may further include instructions that when executed by the one or more processors cause the one or more processors to: based on the profile, determine a status of the user; and determine a queue location for the user based on the determined status. The user-identification module may further include instructions that when executed by the one or more processors cause the one or more processors to: receive information associated with one or more beacons; and based on the information received from the computing device associated with the user and the information associated with the one or more beacons, determine the location of the user. The information from the computing device associated with the user may be received from a loyalty application executed by the computing device associated with the user.

In an embodiment, a system for proving location-based services is provided. The system includes one or more processors and a memory communicably coupled to the one or more processors. The memory stores a user-identification module and an employee-management module. The user-identification module includes instructions that when executed by the one or more processors cause the one or more processors to: for each employee of a plurality of employees associated with an entity: receive information from a computing device associated with the employee; and based in part of the received information, determine a location of the employee at one or more times. The employee-management module includes instructions that when executed by the one or more processors cause the one or more processors to: for each employee of the plurality of employees: store the determined location and one or more times for the employee; retrieve a schedule associated with the employee, wherein the schedule includes scheduled locations for the employee at one or more times; and based on the retrieved schedule and the determined location of the employee at the one or more times, determine compliance or non-compliance of the employee with respect to the retrieved schedule.

Embodiments may include some or all of the following features. The employee-management module may further includes instructions that when executed by the one or more processors cause the one or more processors to: receive information indicative of customer demand; and based on the determined compliance or non-compliance of the employees and the information indicative of customer demand, make one or more changes to the schedules associated with one or more employees of the plurality of employees. The employee-management module may further include instructions that when executed by the one or more processors cause the one or more processors to: update a timesheet associated with an employee of the plurality of employees based on the determined location of the employee at the one or more times. The employee-management module may further include instructions that when executed by the one or more processors cause the one or more processors to: determine an average amount of time spent performing one or more activities by the employees of the plurality of employees based on the determined locations of the employees at the one or more times; and schedule one or more training sessions for the one or more activities based on the determined average amount time spent performing the one or more activities. The employee management module may further includes instruction that when executed by the one or more processors cause the one or more processors to: identify a customer; determine an employee of the plurality of employees that previously worked with the identified customer; and dispatch the determined employee to the identified customer.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
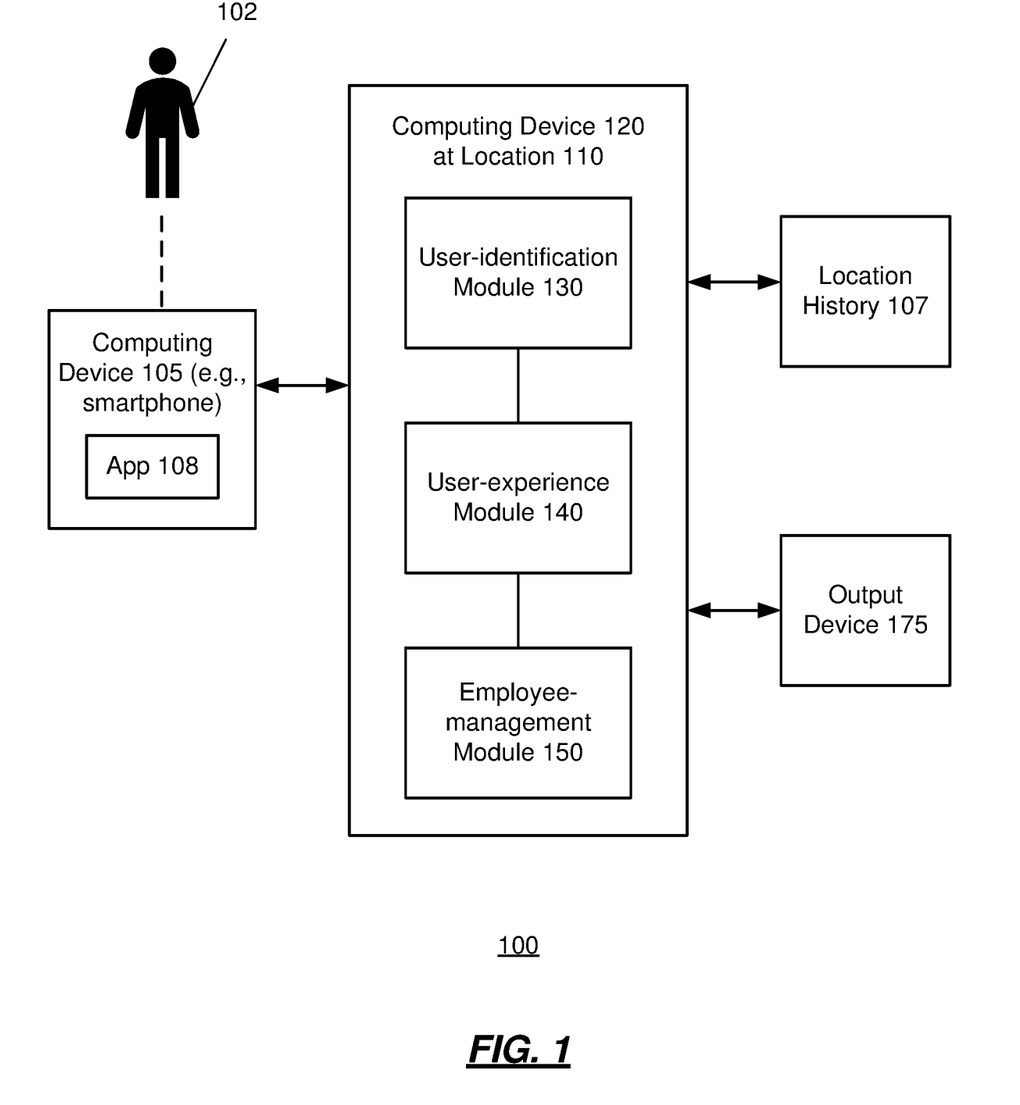
FIG. 1 is an illustration of an exemplary environment for providing location aware services.

FIG. 1 is an illustration of an exemplary environment 100 for providing location aware services. As used herein a location aware service is any service that is based, at least in part, on the location of a user 102 such as a customer or an employee.

As shown in the environment 100, the user 102 maintains a computing device 105, such as a smartphone or any other portable electronic device or wireless communication device. In some implementations, the computing device 105 has an app 108 stored thereon that uses the location aware technology of the computing device 105. The location aware technology may include GPS, for example. Other technologies may be used.

In one embodiment, the app 108 may be a loyalty app associated with a retail establishment. The user 102 may download the app 108 from the retail establishment (or from an app store), and may receive coupons, promotions, or other information from the retail establishment through the app 108.

In another embodiment, the app 108 may be associated with a particular company or workplace. A user 102 that is an employee at the workplace may download the app 108 to their computing device 105 as described above. The user 102 may use the app 108 to perform work functions or to exchange information with their employer. For example, the user 102 may view and receive their work schedule using the app 108, may receive email or other work-related communications through the app 108, or may be authenticated or otherwise provided access to one or more buildings or other computing devices through the app 108.

The computing device 105 is in communication with a computing device 120 at a location 110. The location 110 may be any geographic location associated with a business or entity such as a retailer, an office, a building, a shopping mall, workplace, etc. Depending on the embodiment, the location 110 may be an area that includes the particular business or entity. The computing device 105 and the computing device 120 at the location 110 may be in communication with each other via a network. The computing device 120 may also be in communication with an output device 175 via a network. The output device 175 may comprise a display, speakers, a printer, and/or another computing device.

The network may be a variety of network types including the public switched telephone network (PSTN), a cellular telephone network, and a packet switched network (e.g., the Internet). Although only one computing device 105, one computing device 120, and one output device 175 are shown in FIG. 1, there is no limit to the number of computing devices and output devices that may be supported.

Figure 6:
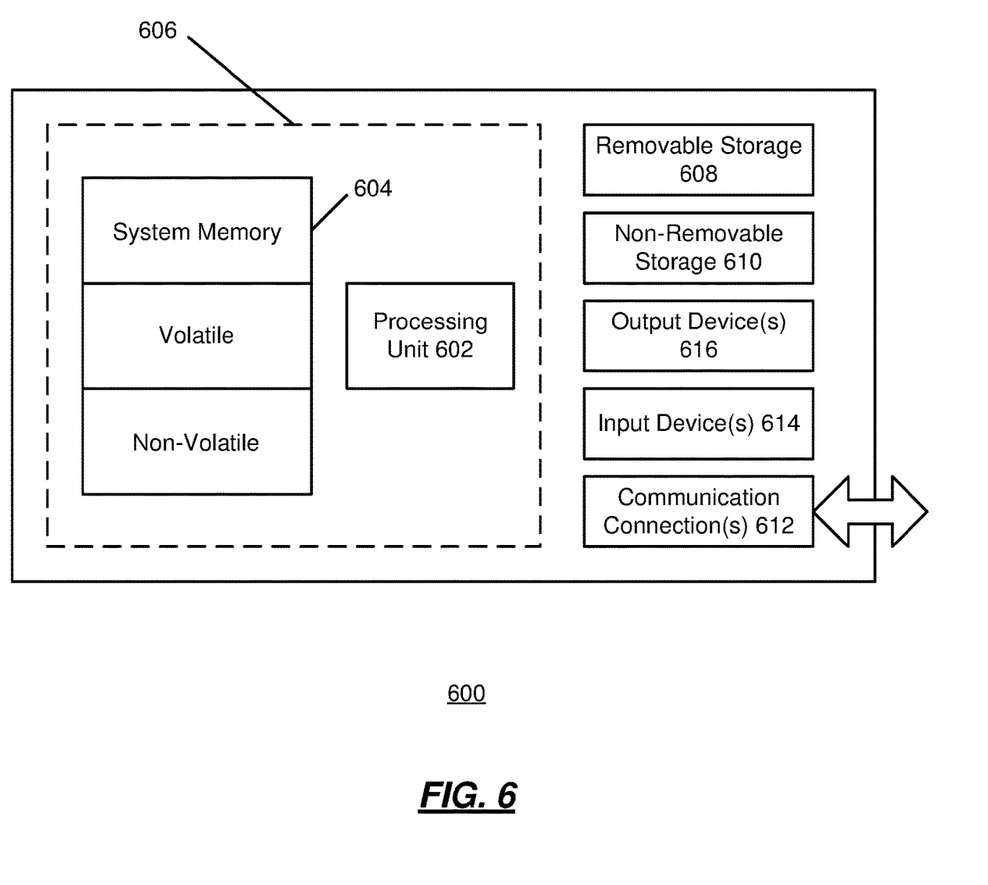
FIG. 6 shows an exemplary computing environment in which example embodiments and aspects may be implemented.

The computing device 105, the computing device 120, and the output device 175 may each be implemented using a variety of computing devices such as smartphones, desktop computers, laptop computers, tablets, set top boxes, vehicle navigation systems, and video game consoles. Other types of computing devices may be supported. A suitable computing device is illustrated in FIG. 6 as the computing device 600.

The computing device 120 at the location 110 comprises a user-identification module 130, a user-experience module 140, and an employee-management module 150. More or fewer modules may be supported. Depending on the embodiment, the modules 130, 140, and 150 may each be implemented by the same computing device or by different computing devices. Moreover, some of the modules 130, 140, 150 may be implemented completely, or in part, by a cloud-computing environment away from the location 110.

The user-identification module 130 may receive information from an app 108 executing on a computing device 105 and may use the information to identify a location of the computing device 105 (and therefore the user 102). Depending on the embodiment, the app 108 may access a GPS, or other location determination functionality associated with the computing device 105 and may include the location of the computing device 105 in the information provided to the user-identification module 130. The user-identification module 130 may then extract the location from the received information. The location of the user 102 may be the location of the user 102 within the location 110 (e.g., the retail establishment or workplace), or outside of the location 110. Other methods for determining the location of a user 105 may be used including Wi-Fi or cellular based triangulation, for example.

When the user is within the location 110, additional information may be used to more precisely determine the location of the user 102 within the location 110. For example, a location 110 such as a retail establishment or workplace may have beacons placed throughout the location 110. The beacons may communicate with the computing device 105 while the user 102 is in the location 110 using Bluetooth or other wireless technology. Based on the strength of signals received by each beacon from the computing device 105, the user-identification module 130 may more precisely determine the location of the computing device 105 within the location 110. Other methods for more precisely determining the location of a computing device 105 in a location 110 may be used.

The user-identification module 130 may further identify the user 102 associated with the computing device 105. In some embodiments, the app 108 may identify the user 102 in the information provided to the user-identification module 130. The information may include a token or other data that uniquely identifies the user 102 associated with the app 108 to the user-identification module 130.

In some embodiments, the user-identification module 130 may use other information associated with the location 110 to identify the user 102. For example, the location 110 may use facial recognition technology and one or more cameras at the location 110 to identify the user 102 and/or determine the location of the user 102. Other information may be used to identify the user 102 such as a fingerprint scan provided by the user 102 when entering the location 110, and a security card, key, or access code used by the user to access the location 110. Any method for identifying a user may be used.

The user-identification module 130 may store the determined locations for each identified user 102 as a location history 107. Depending on the embodiment, the location history 107 for a user 102 may include the determined locations for the user 102 along with the times when each location was determined. As will be described further below, this location history 107 may be used to provide various enhanced services to users 102 based on the current location of the user 102 and their previous locations. As may be appreciated, the information contained in the location history 107 may include personal and private information. Accordingly, the user-identification module 130 may not collect locations or store a location history 107 for a user 102 unless the user 102 opts-in or otherwise consents to the collection and storage of such information.

As will be described in further detail with respect to FIG. 2, the user-experience module 140 may provide location aware services to users 102 (e.g., customers) at locations 110 corresponding to businesses or retail environments using the locations and location histories 107 provided by the user-identification module 130. The businesses and retail environments may include banks, clothing or other retail stores, supermarkets, salons, libraries, movie theaters, or any other entity at which a user 102 may purchase or use a particular good or service.

For example, the user-identification module 130 may determine, based on the location of the computing device 105 that the user 102 is near the location 110 corresponding to a particular business. In response, the user-experience module 140 may provide one or more advertisements or coupons that may be displayed to the user by the app 108. In another example, when a user 102 is determined to be located within a particular business, the user-experience module 140 may dispatch an employee to the location associated with the user 102. The employee may be provided the name of the user 102 to personalize the interaction. Additional location aware services may be provided by the user-experience module 140.

As will be described further with respect to FIG. 3, the employee-management module 150 may provide location aware services to users 102 (e.g., employees) at locations 110 corresponding to workplaces or business environments using the locations and location histories 107 provided by the user-identification module 130. For example, the employee-management module 150 may use the location histories 107 to track the locations of employees as they enter and exit the location 110 associated with the work environment. The employee-management module 150 may use this information to track when users 102 are working (i.e., clock in and out), to determine compliance with scheduled work hours and work locations, and to determine if more or fewer users 102 should be scheduled. In another example, the location information can be used to further authenticate users 102 for purposes of entry or for tool or computer usage. Additional location aware services may be provided by the employee-management module 150.

Figure 2:
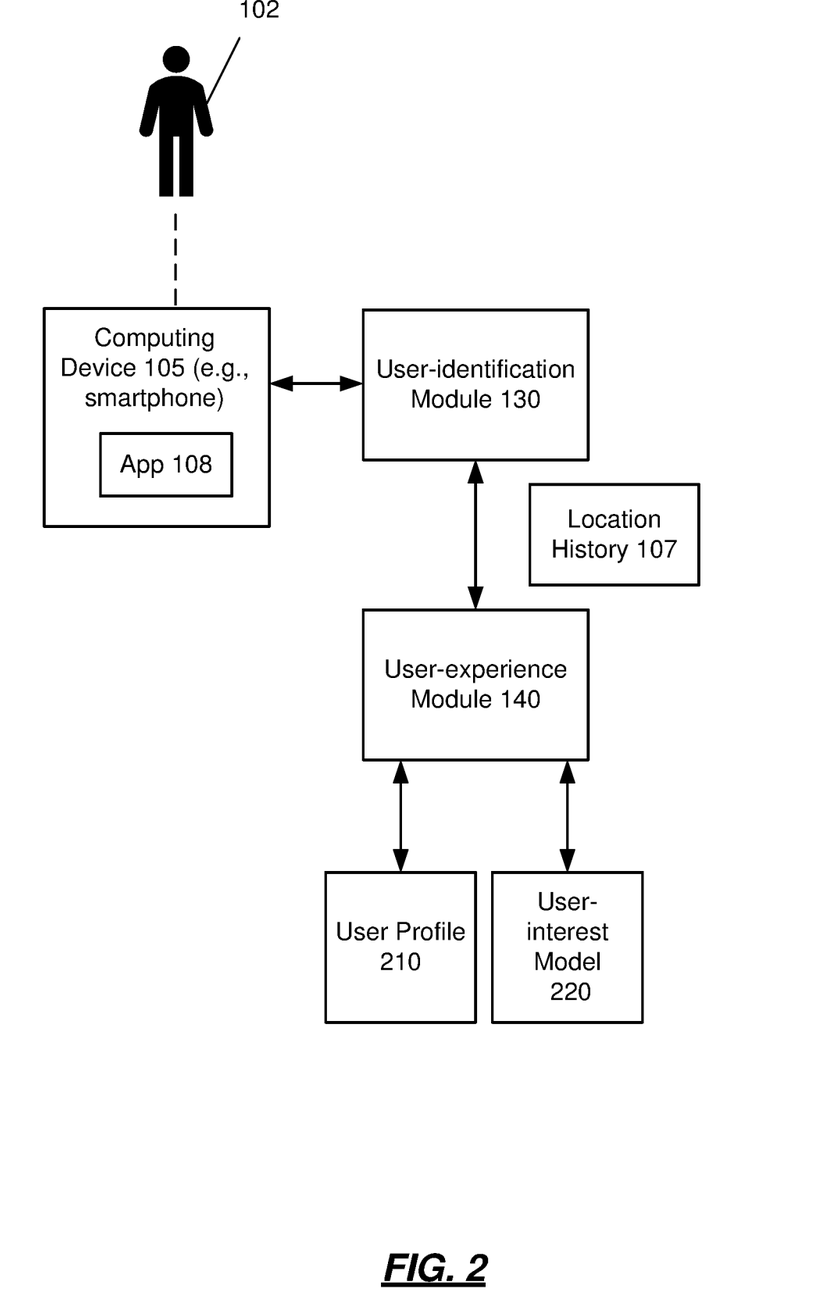
FIG. 2 is an illustration of an exemplary user-experience module for providing location aware services to one or more users.

FIG. 2 is an illustration of an exemplary user-experience module 140 for providing location aware services to one or more users 102. As described above, the user-experience module 140 may be associated with a retail environment (e.g., a store that sells goods and/or services) or a branch office environment (e.g., a branch of a financial institution, such as a local office of regional, national, or international bank). In such environments, an app 108 may be installed on the computing device 105 (e.g., a smartphone) of a user 102 (i.e., a customer).

The app 108 may be a loyalty app or a banking app, although these are merely examples and not intended to be limiting as many other types of apps 108 are contemplated. The app 108 includes location aware technology such as GPS. The app 108 may provide the location of the user 102 at a variety of times and may provide such information, along with an identifier of the user 102, to the user-identification module 130. The user-identification module 130 may then provide the location information to the user-experience module 140 as the location history 107 for the user 102. Depending on the embodiment, the location history 107 provided to the user-experience module 140 for a user 102 may include the most recently determined location and time for the user 102, along with some subset of previously determined locations and times for the user 102.

The location history 107 associated with a user 102 may also include locations determined using technology other than the app 108. For example, the retail environment may include a camera that is able to identify a user 102 using face-recognition. When a user is identified by a camera, the user-identification module 130 may add the user 102 and the location of the camera to the location history 107. Other methods and techniques for locating a user 102 may be used.

The user experience module 140 may maintain a user profile 210 for each user 102 associated with the user-experience module 140 (i.e., each user 102 associated with an app 108). The user profile 210 may include a variety of information about the user 102 such as their name, address, phone number, information about the last time that the user 102 visited the location 110 or associated location 110, information about any purchases made by the user 102, information about any employees that the user 102 previously interacted with, information that can be used to authenticate or identify the user 102 such as description of the user 102 or biometric information associated with the user 102 (e.g., fingerprints or face-recognition information associated with the user 102). As will be described further below, any information that can be used to enhance the experience of the user 102 with respect to the business or retail establishment corresponding to the location 110 may be used.

In one example, the user-experience module 140 may be used to prevent fraud. When a user 102 enters a location 110 associated with a retail establishment, the user-identification module 130 identifies the user 102 based on information received from the app 108. Depending on the embodiment, the user-experience module 140 may then use biometric information from the user profile 210 associated with the user 102 to further authenticate the user 102 or may trust the information received from the user-identification module 130. Later, if the user 102 desires to purchase an item, the user-experience module 140 can process payment for the item using information from the user profile 210. If the identify of the user 102 cannot be determined by the user-identification module 130 (or verified by the user-experience module 140) the purchase of the item can be refused.

As may be appreciated the fraud detection system based on user 102 authentication can be used in a variety of retail environments. For example, with respect to a bank, the user 102 entering the bank can be immediately identified and authenticated. The user 102 may then be permitted to perform one or more transactions without having to provide or show identification. As another example, if the user has an appointment at the bank, when the user enters the bank the identity of the user 102 can be used by the user-experience module 140 to authenticate the user 102 and to determine the appointment associated with the user 102. The user-experience module 140 may then summon an employee to assist the user 102 based on the user location or may push a message to the app 108 with instructions for the user 102 regarding their appointment.

As another example, the user-experience module 140 can use the location information provided by the user-identification module 130 to identify high-priority customers and to ensure that those customers are treated well. For example, when a user 102 enters the location 110 associated with a business, the user-experience module 140 may use the user profile 210 associated with the user 102 to determine if the user 102 is a high-priority customer. Depending on the embodiment, a user 102 may be a high-priority customer if they spent more than a threshold amount of money with the business. Other criteria may be used. If the user is 102 is a high priority customer, then the user-experience module 140 may take actions such as selecting a best employee to dispatch to the location of the user 102, or to move the user 102 to the front of a queue or line associated with the business. For example, if the business is a restaurant, the user-experience module 140 may automatically move the user 102 to the top of a waiting list for tables.

As another example, the user-experience module 140 may use the location of the user 102 and information in the user profile 210 to provide an enhanced experience to the user. After the user-identification module 130 determines the identity and location of the user 102, the user-experience module 140 may use the associated user profile 210 to determine past experiences and preferences of the user 102 with respect to the business. For example, the past experiences and preferences may include items that were purchased or returned by the user 102, or information about the user 102 such as preferred brands and which employees previously worked with the user 102. Other information may be included.

The user-experience module 140 may then use the determined experiences and preferences to select an employee to greet the user 102 at their associated location. The employee may be provided the determined experiences and preferences so that the employee appears knowledgeable about the user 102 including their preferences and past experiences with the business. The employee may be provided the information at a computing device 105 associated with the employee. After the employee is finished with the user 102, the employee may use their computing device 105 to update the user profile 210 to include any new information learned by the employee (e.g., new preferences and any purchases made by the user).

As another example, the user-experience module 140 may use the identity and location of the user 102 to determine any outstanding orders associated with the user 102 and may use the determined location and identity to fulfil the outstanding order. For example, the user experience module 140 may be associated with a restaurant. Upon entering the restaurant, the user-experience module 140 may determine that the user 102 is associated with an order that was placed by the user 102 using the app 108. The user-experience module 140 may determine whether the order is ready, and if so, may dispatch an employee with the order to the location associated with the user 102. If the order is not ready, the user-experience module 140 may send a message to the user 102 through the app 108 indicating that the order is not ready.

In another example, the user-experience module 140 may generate a user-interest model 220 that is configured to recommend items or services to the user 102 based on the history of items or services used by the user 102 as indicated by their user profile 210. Depending on the embodiment, the user-experience module 140 my train the model 220 using the purchase histories of other users 102. The model 220 may be trained using machine learning or artificial intelligence related techniques. Any method for creating a predictive model may be used.

The user-experience module 140 may use the user-interest model 220 to determine one or more items or services to recommend to the user 102. In one example, when the user 102 is determined to have entered the location 110 associated with a business, the user-experience module 140 may use the user-interest model 220, and the history of user 102 purchases from the user profile 210, to determine one or more items that the user 102 is likely to enjoy or purchase. The user-experience module 140 may then dispatch an employee to the location of the user 102 with instructions to show the user 102 the determined one or more items. In another embodiment, when the user 102 is determined to be located near the location 110 of the store (e.g., walking by), the user-experience module 140 may push information about the determined one or more items to the app 108 on the computing device 105 of the user 102. The information may include coupons or other incentives for the user 102 to purchase the determined one or more items.

Figure 3:
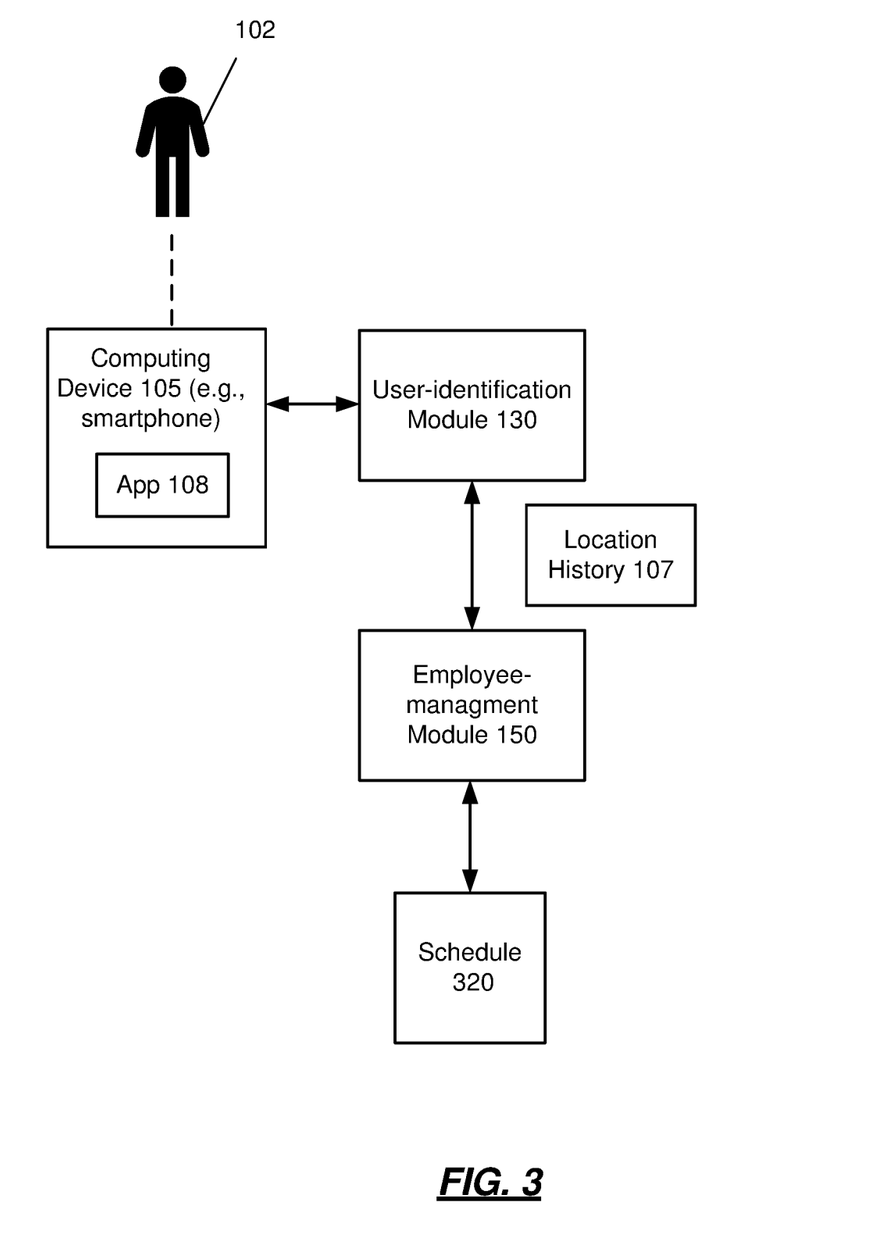
FIG. 3 is an illustration of an exemplary employee-management module for providing location enhanced services for one or more employees.

FIG. 3 is an illustration of an exemplary employee-management module 150 for providing location enhanced services for one or more employees (e.g., users 102). As described above, the employee-management module 150 may be associated with a workplace (e.g., a business). In such environments, an app 108 may be installed on the computing device 105 (e.g., a smartphone) associated with each employee. The app 108 may be installed as a condition of employment and may be used for a variety of purposes such as employee authentication (e.g., for building or computer access), and to distribute information and communicate with employees (e.g., email or text messaging). The app 108 may include location aware technology.

The app 108 may provide the location of the associated employee at a variety of times and may provide such information, along with an identifier 102 of the employee, to the user-identification module 130. The user-identification module 130 may then provide the location information to the employee-management module 150 as the location history 107 for the employee. Depending on the embodiment, the location history 107 provided to the employee-management module 150 for an employee may include the most recently determined location and time for the employee, along with some subset of previously determined locations and times for the employee. Depending on the embodiment, the employee-management module 150 may store the location histories 107 for each employee and may use the histories 107 for a variety of purposes such as tracking employee work time, and determining compliance or non-compliance with schedules 320, for example.

As may be appreciated, the location histories 107 for each employee is not limited to information received from the app 108 or computing device 105 associated with each employee. For example, the location of the employee in the workplace may be determined from one or more biometric sensors such as fingerprint readers or cameras equipped with facial recognition technology. As another example, when an employee logs into a computer with a known location or accesses a secure door with a known location, these locations can be used to update the location history 107 associated with the employee. Other devices such as beacons located in the workplace may be used to determine the location of the employee and to update the location history 107.

As described above, the employee-management module 150 may be used to provide workforce management. One example of workforce management is timekeeping. For example, the employee-management module 150 may use the location history 107 associated with an employee to determine how much time the employee worked for the employer. Depending on the embodiment, the employee-management module 150 may use the location history 107 to determine how much time the employee was at a location that is associated with the workplace (i.e., the location 110). The employee-management module 150 may then credit the employee with the determined time. As another example, the employee-management module 150 may "clock in" the employee when the user-identification module 130 determines that the employee (and associated computing device 105) is at a location associated with the workplace and may "clock out" the employee when the user-identification module 130 determines that the employee is no longer at a location associated with the workplace.

Another example of workforce management is schedule adherence or compliance. Depending on the embodiment, each employee may be associated with a schedule 320. A schedule 320 may indicate the times and locations where the associated employee is scheduled to work over a given period (e.g., day, week, or month). The employee-management module 150 may retrieve the location history 107 associated with an employee and may determine if the history 107 is in compliance with the schedule 320 associated with the employee. For example, the employee-management module 150 may determine if the locations and times of the employee as shown in the location history 107 generally comport or align with the locations and times in the schedule 320.

Another example of workforce management is real-time on demand scheduling. The employee-management module 150 may monitor the number of employees that are working at a given time based on the location history 107 associated with each employee. If the number is less than an expected number (due to sickness, lateness, improper scheduling, etc.), the employee-management module 150 may recommend that additional employees be scheduled.

In addition, because the user-identification module 130 may also identify users 102 that are customers of the particular workplace, the employee-management module 150 may determine the demand associated with the workplace and may recommend that more or fewer employees be scheduled based on the determined demand. For example, for a workplace such as a bank, the user-identification module 130 may identify the number of customers that are waiting to see an employee such as a teller. In response, the employee management module 150 may schedule additional tellers, or may move employees that are performing different tasks into the role of teller.

As another example, the employee-management module 150 may be used to monitor how long it takes employees to perform certain tasks, and if necessary, may schedule additional training for employees. As may be appreciated, certain locations in the workplace such as locations associated with certain tools, or computer terminals, may be known to be associated with certain tasks. Accordingly, the employee-management module 150 may use the location history 107 associated an employee to estimate how long the employee took to perform the associated task. If the estimated time is above a threshold time, then the employee-management module 150 may schedule the employee for additional training.

As another example, the employee-management module 150 may use the computing devices 105 associated with each employee to collect additional information about a customer in the workplace. For example, when the user-identification module 130 determines that a customer is located in the workplace, the employee management module 150 may locate (using the location histories 107) the employee or employees that are close to the customer. The employee-management module 150 may then use the app 108 on each of the computing devices 105 associated with the employees to collect image, video, or audio data about the customer using the cameras and microphones associated with the computing devices 105. The collected data may then be used by the user-identification module 130 or the employee-management module 150 to identify or authenticate the customer.

As another example, the employee-management module 150 may use the locations and location history 107 of an employee for authentication purposes with respect to a computing device or entrance. For example, when an employee attempts to log into a computing device or enter a door protected by an access code or scanner, the employee-management module 150 may use the location history 107 associated with the employee to determine if the employee is indeed located at or near the computing device or door. If so, the employee-management module 150 may allow access to the computer or door. Else, the employee-management module 150 may deny the access.

In another example, when an employee attempts to log into a computing device or enter a door protected by an access code or scanner, the employee-management module 150 may use the location history 107 associated with the employee to determine if the computing device or door is one that the employee typically uses. If so, the employee-management module 150 may allow access to the computer or door. Else, the employee-management module 150 may deny the access because the employee may have had their credentials stolen.

In another example, an employee may be logged into a computing device at a particular location. However, the location history 107 associated with the employee may show that the employee has not been located near the computing device for more than some threshold amount of time. In response, the employee-management module 150 may cause the employee to be logged out of the computing device.

Figure 4:
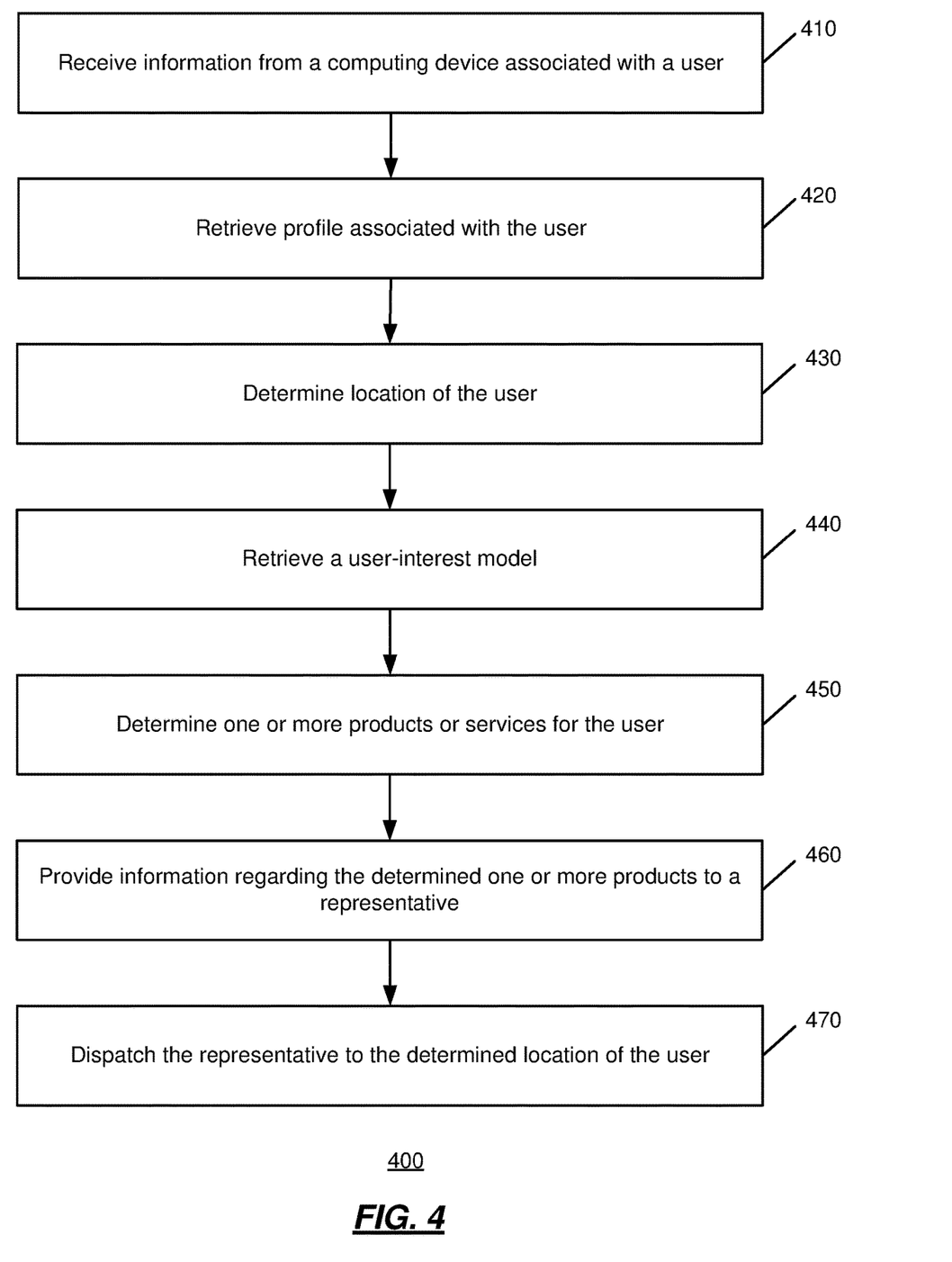
FIG. 4 is an illustration of a method for dispatching a representative to a location associated with a user.

FIG. 4 is an illustration of a method 400 for dispatching a representative to a location associated with a user 102. The method 400 may be performed by the user-identification module 130 and the user-experience module 140 of the computing device 120.

At 410, information is received from a computing device associated with a user. The information may be received by the user-identification module 130 of the computing device 120. The computing device 105 associated with the user 102 may be a mobile device or smartphone, for example. The computing device 105 may be executing an app 108 such as a loyalty app associated with a retail establishment. The retail establishment may be associated with a location 110. The location 110 may be a boundary such as circle or other shape that includes locations that are located inside the associated retail establishment.

Depending on the embodiment, the app 108 may periodically transmit the information to the computing device 120 associated with the retail establishment. The app 108 may transmit the information only when the app 108 determines (using a GPS or other location component of the computing device 105) that is inside or near the location 110 or may continuously transmit the information regardless of its location. The app 108 may provide the information about the user in exchange for coupons or discounts on products or services provided by the retail establishment.

At 420, a profile associated with the user is retrieved. The profile may be the user profile 210 and may be retrieved by the user-experience module 140 based on the identity of the user 102 as determined from the information provided by the app 108. Depending on the embodiment, the user-experience module 140 may authenticate the user 102 using biometric information associated with the user profile 210 and information received from one or more sensors associated with the retail establishment such as fingerprint scanners or cameras (e.g., facial recognition). The user profile 210 may include other information about the user 102 such as user preferences and a purchase and return history with respect to the retail establishment.

At 430, a location associated with the user is determined. The location of the user 102 may be the location of the computing device 105 (i.e., the smartphone of the user 102) and may be determined by the user-identification module 130. In some implementation, the location may be determined using the information provided by the app 108 (e.g., GPS data). Alternatively, the user-identification module 130 may determine the location of the user 102 using other information including information received from one or more cellular towers, or information received from one or more beacons associated with the retail establishment. Any method for determining the location of a computing device 105 may be used.

At 440, a user-interest model is retrieved. The user-interest model 220 may be retrieved by the by the user-experience module 140. The user-interest model 220 may be a model that can predict or recommend products or services that may be of interest to the user 102 based on the information contained in the user profile 210 associated with the user 102. The profile 210 may include indications of products and services that were purchased or used by the user 102, returns or refunds that were made or requested by the user 102, and any reviews or other indicators of satisfaction (or dissatisfaction) that may have been provided by the user 102. The user-interest model 220 may have been generated or trained using machine learning or artificial intelligence techniques using user profiles 210 of other users 102. Any method for generating a model may be used.

At 450, one or more products or services are determined for the user. The one or more products or services may be determined for the user 102 using the retrieved user-interest model 220 and the user profile 210 associated with the user 102. The determined one or more products or services may be products or services that the user 102 is predicted to enjoy or purchase by the user-interest model 220 based on the user profile 210.

At 460, information regarding the determined one or more products or services is provided to a representative. The information may be provided by the user-experience module 140. The representative may be an employee associated with the business or retail establishment where the user 102 is located. Depending on the embodiment, the information may be provided to the representative on a computing device 105 associated with the representative. Alternatively or additionally, the information may be provide to, and displayed on, one or more output devices 175 associated with the business or retail establishment.

At 470, the representative is dispatched to the location associated with the user. The representative may be dispatched by the user-experience module 140. For example, the user-experience module 140 may provide the location of the user 102 to the computing device 105 associated with the representative. The user-experience module 140 may further provide information such as a description or photo of the user 102, a name of the user 102, and any other information that may be used by the representative to find and/or greet the user 102. The representative may then try to sell the determined one or more products or services to the user 102.

Figure 5:
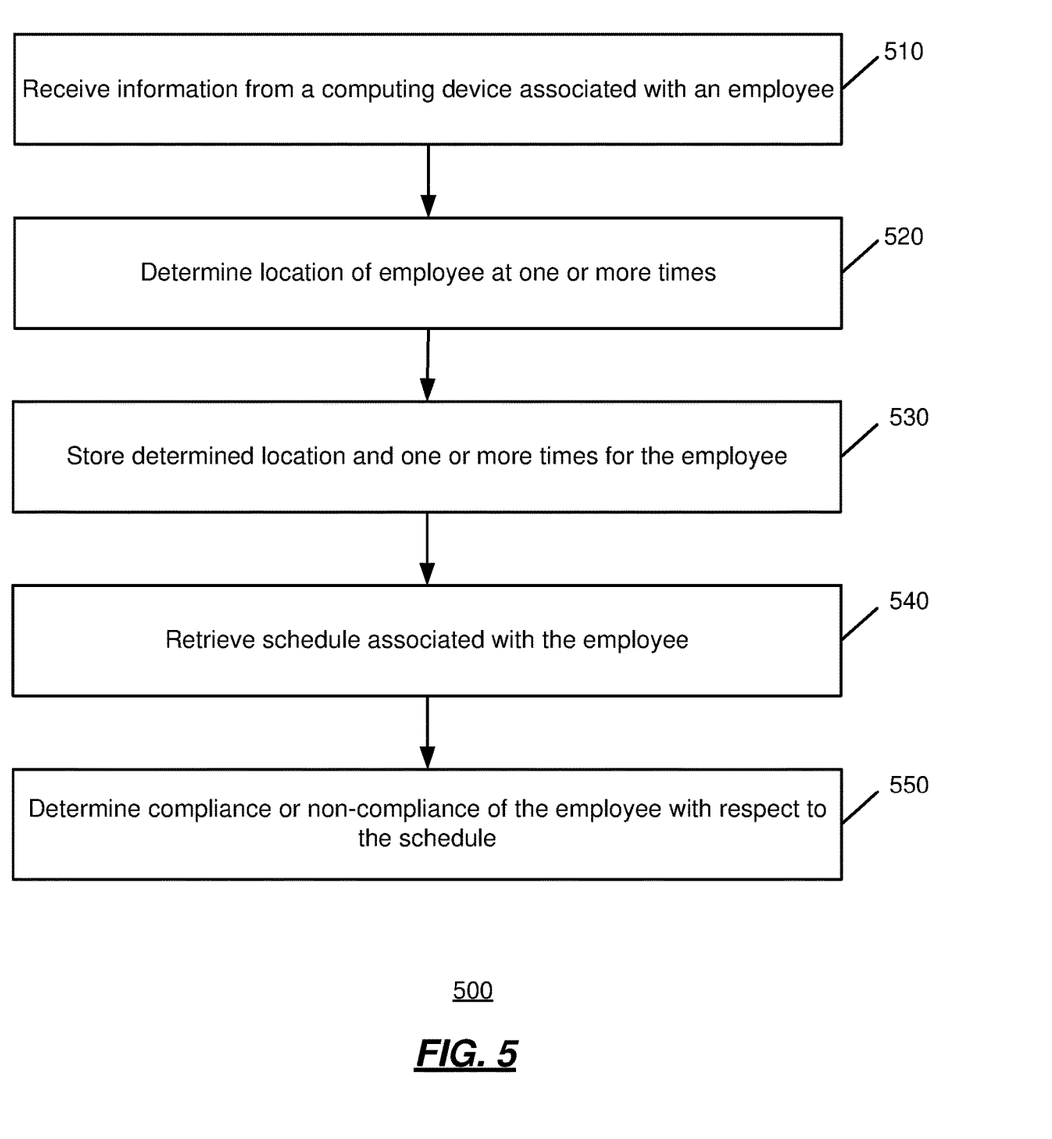
FIG. 5 is an illustration of a method for determining compliance or non-compliance with respect to a schedule.

FIG. 5 is an illustration of a method 500 for determining compliance or non-compliance with respect to a schedule 320. The method 500 may be performed by the user-identification module 130 and employee-management module 150 of the computing device 120.

At 510, information is received from a computing device associated with an employee. The information may be received by the user-identification module 130 of the computing device 120. The computing device 105 associated with the employee (e.g., the user 102) may be a mobile device or smartphone, for example. The computing device 105 may be executing an app 108 associated with a workplace or business that employs the employee. Use of the app 108 may be a condition of employment and the app 108 may be used for a variety of purposes such as entering and/or exiting a buildings, employee authentication, and gaining access to one or more employer systems such as logging into computers. The workplace may be associated with a location 110. The location 110 may be a boundary such as circle or other shape that includes locations located inside or associated with, the workplace.

Depending on the embodiment, the app 108 may periodically transmit the information to the computing device 120 associated with the workplace. The app 108 may transmit the information only when the app 108 determines (using a GPS or other location component of the computing device 105) that is inside or near the workplace or may continuously transmit the information regardless of its location. In some implementations, the app 108 may only transmit the information during regular work hours (e.g., 9 am-5 pm, Monday-Friday).

At 520, a location of the employee is determined at one or more times. The location of the employee may be determined at the one or more times by the user-identification module 130 based on the received information. The location of the employee may be the location of the computing device 105 (i.e., the smartphone of the employee) and may be determined by the user-identification module 130. In some implementations, the location may be determined using the information provided by the app 108 (e.g., GPS data). Alternatively, the user-identification module 130 may determine the location of the employee using other information including information received from one or more cellular towers, information received from one or more beacons associated with the workplace, or information received from one or more biometric sensors such as cameras or fingerprint readers placed throughout the workplace. Any method for determining the location of a computing device 105 at one or more times may be used.

At 530, the determined location and one or more times are stored for the employee. The determined location and one or more times may be stored by the employee-management module 150. Depending on the embodiment, over time the employee-management module 150 may store a plurality of locations and one or more times for each employee associated with the workplace. Any method for storing data may be used.

At 540, a schedule associated with the employee is retrieved. The schedule 320 associated with the employee may be retrieved by the employee-management module 150. Depending on the embodiment, the schedule 320 may include a plurality of times and locations that describe when and where an associated employee is scheduled to work. The schedule 320 associated with an employee may have been determined by a user or administrator. The schedule 320 may cover or may be associated with a particular time range such as a week, for example.

At 550, compliance or non-compliance with the retrieved schedule is determined. The compliance or non-compliance with the schedule 320 may be determined by the employee-management module 150 using the stored locations and one or more times for the employee. The locations and one or more times may correspond to the times covered by the schedule 320. The employee-management module 150 may determine compliance or non-compliance by comparing the stored locations at the one more times with the locations and times in the schedule 320. If the stored times and stored locations generally comport to the times and location in the schedule 320, then the employee may be determined to be in compliance with the schedule 320. Otherwise, the employee may be determined to not be in compliance with the schedule 320.

FIG. 6 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by the device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communication connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for proving location aware services comprising:
    one or more processors; and
    a memory communicably coupled to the one or more processors and storing:
        a user-identification module including instructions that when executed by the one or more processors cause the system to:
            for each employee of a plurality of employees associated with an entity:
                receive information from a computing device associated with the employee; and
                based in part of the received information, determine a location of the employee at one or more times;
        an employee-management module including instructions that when executed by the one or more processors cause the system to:
            for each employee of the plurality of employees:
                store the determined location and one or more times for the employee;
                retrieve a schedule associated with the employee, wherein the schedule includes scheduled locations for the employee at one or more times;
                based on the retrieved schedule and the determined location of the employee at the one or more times, determine compliance or non-compliance of the employee with respect to the retrieved schedule;
                based on the determined location and one or more times for the employee and a location associated with a task, determine an amount of time the employee spent performing the task;
                determine that the amount of time is above a threshold time; and
                in response to the determination that the amount of time is above the threshold time, schedule the employee for training on the task; and
        a user-experience module including instructions that when executed by the one or more processors cause the system to:
            receive a purchase history of a customer and purchase histories of other customers;
            train a user-interest model based on the purchase history of the customer and the purchase history of the other customers using machine learning;
            based in part on the user-interest model and a profile, predict one or more products that the customer will purchase;
            determine a status of the customer using the profile;
            select an employee of the plurality of employees based on the determined status;
            provide information regarding the predicted one or more products and information about the customer to the selected employee; and
            dispatch the selected employee to the customer.

2. The system of claim 1, wherein the employee-management module further includes instructions that when executed by the one or more processors cause the system to:
    receive information indicative of customer demand; and
    based on the determined compliance or non-compliance of the employees and the information indicative of customer demand, make one or more changes to the schedules associated with one or more employees of the plurality of employees.

3. The system of claim 1, wherein the employee-management module further includes instructions that when executed by the one or more processors cause the system to:
    update a timesheet associated with an employee of the plurality of employees based on the determined location of the employee at the one or more times.

4. The system of claim 1, wherein the employee-management module further includes instructions that when executed by the one or more processors cause the system to:
    determine an average amount of time spent performing one or more activities by the employees of the plurality of employees based on the determined locations of the employees at the one or more times; and schedule one or more training sessions for the one or more activities based on the determined average amount time spent performing the one or more activities.

5. A method for proving location aware services comprising:
for each employee of a plurality of employees associated with an entity:
receiving information from a computing device associated with the employee by a computing device;
based in part of the received information, determining a location of the employee at one or more times by the computing device;
storing the determined location and one or more times for the employee by the computing device;
retrieving a schedule associated with the employee by the computing device, wherein the schedule includes scheduled locations for the employee at one or more times;
based on the retrieved schedule and the determined location of the employee at the one or more times, determining compliance or non-compliance of the employee with respect to the retrieved schedule by the computing device;
based on the determined location and one or more times for the employee and a location associated with a task, determining an amount of time the employee spent performing the task by the computing device;
determining that the amount of time is above a threshold time by the computing device; and
in response to the determination that the amount of time is above the threshold time, scheduling the employee for training on the task by the computing device;
receiving a purchase history of a customer and purchase histories of other customers by the computing device;
training a user-interest model based on the purchase history of the customer and the purchase history of the other customers using machine learning by the computing device;
based in part on the user-interest model and a profile, predicting one or more products that the customer will purchase by the computing device;
determining a status of the customer using the profile by the computing device;
selecting an employee of the plurality of employees based on the determined status by the computing device;
providing information regarding the predicted one or more products and information about the customer to the selected employee by the computing device; and
dispatching the selected employee to the customer by the computing device.

6. The method of claim 5, further comprising:
receiving information indicative of customer demand; and
based on the determined compliance or non-compliance of the employees and the information indicative of customer demand, making one or more changes to the schedules associated with one or more employees of the plurality of employees.

7. The method of claim 5, further comprising:
updating a timesheet associated with an employee of the plurality of employees based on the determined location of the employee at the one or more times.

8. The method of claim 5, further comprising:
determining an average amount of time spent performing one or more activities by the employees of the plurality of employees based on the determined locations of the employees at the one or more times; and scheduling one or more training sessions for the one or more activities based on the determined average amount time spent performing the one or more activities.

9. A non-transitory computer-readable medium with instructions stored thereon that when executed by a processor of a system cause the system to:
for each employee of a plurality of employees associated with an entity:
receive information from a computing device associated with the employee;
based in part of the received information, determine a location of the employee at one or more times;
store the determined location and one or more times for the employee;
retrieve a schedule associated with the employee, wherein the schedule includes scheduled locations for the employee at one or more times;
based on the retrieved schedule and the determined location of the employee at the one or more times, determine compliance or non-compliance of the employee with respect to the retrieved schedule;
based on the determined location and one or more times for the employee and a location associated with a task, determine an amount of time the employee spent performing the task;
determine that the amount of time is above a threshold time; and
in response to the determination that the amount of time is above the threshold time, schedule the employee for training on the task;
receive a purchase history of a customer and purchase histories of other customers;
train a user-interest model based on the purchase history of the customer and the purchase history of the other customers using machine learning;
based in part on the user-interest model and a profile, predict one or more products that the customer will purchase; determining a status of the customer using the profile by the computing device;
select an employee of the plurality of employees based on the determined status;
provide information regarding the predicted one or more products and information about the customer to the selected employee; and
dispatch the selected employee to the customer.

10. The non-transitory computer-readable medium of claim 9, further comprising instructions stored thereon that when executed by the processor of the system cause the system to:
receive information indicative of customer demand; and
based on the determined compliance or non-compliance of the employees and the information indicative of customer demand, make one or more changes to the schedules associated with one or more employees of the plurality of employees.

11. The non-transitory computer-readable medium of claim 9, further comprising instructions stored thereon that when executed by the processor of the system cause the system to:
update a timesheet associated with an employee of the plurality of employees based on the determined location of the employee at the one or more times.

12. The non-transitory computer-readable medium of claim 9, further comprising instructions stored thereon that when executed by the processor of the system cause the system to:

determine an average amount of time spent performing one or more activities by the employees of the plurality of employees based on the determined locations of the employees at the one or more times; and schedule one or more training sessions for the one or more activities based on the determined average amount time spent performing the one or more activities.

\* \* \* \* \*